US012203039B2

(12) United States Patent
Gordo et al.

(10) Patent No.: US 12,203,039 B2
(45) Date of Patent: Jan. 21, 2025

(54) FOULING MITIGATION OF DELAYED COKER HEATERS

(71) Applicant: AMEC Foster Wheeler USA Corporation, Houston, TX (US)

(72) Inventors: Luis Gordo, Katy, TX (US); Srinivasa Srivatsan, Sugar Land, TX (US); Richard A. Conticello, Houston, TX (US)

(73) Assignee: AMEC FOSTER WHEELER USA CORPORATION, Houston, TX (US)

( * ) Notice: Subject to any disclaimer, the term of this patent is extended or adjusted under 35 U.S.C. 154(b) by 0 days.

(21) Appl. No.: 18/180,260

(22) Filed: Mar. 8, 2023

(65) Prior Publication Data

US 2023/0287275 A1 Sep. 14, 2023

Related U.S. Application Data

(60) Provisional application No. 63/318,571, filed on Mar. 10, 2022, provisional application No. 63/318,558, filed on Mar. 10, 2022.

(51) Int. Cl.
| | |
|---|---|
| *C10G 9/16* | (2006.01) |
| *C10B 57/04* | (2006.01) |
| *C10B 57/06* | (2006.01) |
| *C10G 1/10* | (2006.01) |
| *C10G 9/00* | (2006.01) |

(52) U.S. Cl.
CPC ............. *C10G 9/16* (2013.01); *C10B 57/045* (2013.01); *C10B 57/06* (2013.01); *C10G 1/10* (2013.01); *C10G 9/005* (2013.01); *C10G 2300/1003* (2013.01); *C10G 2300/107* (2013.01); *C10G 2300/1077* (2013.01); *C10G 2300/4006* (2013.01); *C10G 2300/4075* (2013.01); *C10G 2300/80* (2013.01)

(58) Field of Classification Search
CPC .... C10G 9/16; C10G 9/005; C10G 2300/107; C10G 2300/1077; C10G 2300/4006; C10G 2300/80
See application file for complete search history.

(56) References Cited

U.S. PATENT DOCUMENTS

| 2,020,714 A | 11/1935 | Carl et al. |
| 2,600,450 A | 6/1952 | Van |
| (Continued) | | |

FOREIGN PATENT DOCUMENTS

| CN | 103100240 B | 8/2015 |
| CN | 108359513 A | 8/2018 |
| (Continued) | | |

OTHER PUBLICATIONS

Cevada, E., et al., "High molar mass polyethers as defoamers of heavy crude oil", Fuel, vol. 221, Jun. 1, 2018, pp. 447-454.

(Continued)

*Primary Examiner* — Randy Boyer
*Assistant Examiner* — Juan C Valencia
(74) *Attorney, Agent, or Firm* — Brian J. Colandreo; Jeffrey T. Placker; Holland & Knight LLP

(57) ABSTRACT

A method of mitigating fouling in a delayed coking unit heater may include forming a plastic mixture including a plastic material and a carrier. The plastic mixture may be combined with a coker feedstock upstream of a coke drum.

19 Claims, 3 Drawing Sheets

(56) References Cited

U.S. PATENT DOCUMENTS

| | | | |
|---|---|---|---|
| 3,127,352 | A | 3/1964 | Na |
| 3,235,484 | A | 2/1966 | Colfer |
| 3,364,130 | A | 1/1968 | Barnum et al. |
| 3,668,111 | A | 6/1972 | Dvoracek |
| 3,793,223 | A | 2/1974 | Lichtman, I |
| 4,384,976 | A | 5/1983 | Grunert et al. |
| 4,397,737 | A | 8/1983 | Kray |
| 4,961,840 | A * | 10/1990 | Goyal .................... C10G 9/005 208/48 AA |
| 5,389,299 | A | 2/1995 | Hart |
| 5,460,712 | A | 10/1995 | Lemke |
| 5,800,738 | A | 9/1998 | Hart |
| 6,117,308 | A * | 9/2000 | Ganji ..................... C10B 55/00 202/96 |
| 6,277,333 | B1 | 8/2001 | Schutte et al. |
| 7,695,669 | B2 | 4/2010 | Araki et al. |
| 10,655,070 | B2 | 5/2020 | Wheeler et al. |
| 11,421,159 | B2 | 8/2022 | Pradeep et al. |
| 11,859,132 | B2 | 1/2024 | Siddiqui et al. |
| 11,866,665 | B2 | 1/2024 | Gul et al. |
| 11,987,755 | B2 | 5/2024 | Subramaniyam et al. |
| 12,060,526 | B2 | 8/2024 | Respini et al. |
| 2004/0176259 | A1 | 9/2004 | Esselbrugge et al. |
| 2006/0196811 | A1 | 9/2006 | Eppig et al. |
| 2007/0008812 | A1 | 1/2007 | Bush et al. |
| 2008/0082295 | A1 | 4/2008 | Kant et al. |
| 2009/0170997 | A1 | 7/2009 | Kannan et al. |
| 2010/0038290 | A1 | 2/2010 | Wang et al. |
| 2010/0170829 | A1 | 7/2010 | Ng et al. |
| 2010/0300940 | A1 | 12/2010 | Volk, Jr. |
| 2011/0028573 | A1 | 2/2011 | Hassan et al. |
| 2011/0147275 | A1 | 6/2011 | Ng et al. |
| 2014/0259885 | A1 | 9/2014 | Ng et al. |
| 2014/0374317 | A1 | 12/2014 | Barker |
| 2015/0076034 | A1 * | 3/2015 | Etter ..................... C10G 47/32 208/112 |
| 2016/0010006 | A1 | 1/2016 | Subbiah et al. |
| 2016/0305651 | A1 | 10/2016 | Lloyd |
| 2017/0101583 | A1 | 4/2017 | Bran et al. |
| 2017/0152453 | A1 | 6/2017 | Goerz |
| 2017/0321127 | A1 | 11/2017 | Banerjee et al. |
| 2019/0203131 | A1 | 7/2019 | Yu et al. |
| 2019/0388863 | A1 | 12/2019 | Sibtain et al. |
| 2021/0155843 | A1 * | 5/2021 | Gul ........................ C09K 8/524 |
| 2022/0372375 | A1 | 11/2022 | Patel et al. |
| 2023/0145975 | A1 * | 5/2023 | Subramaniyam ........ C10G 1/10 585/241 |
| 2023/0312863 | A1 | 10/2023 | Timken et al. |
| 2024/0084095 | A1 | 3/2024 | Patel et al. |
| 2024/0084199 | A1 | 3/2024 | Patel et al. |
| 2024/0093102 | A1 | 3/2024 | Patel et al. |
| 2024/0182800 | A1 | 6/2024 | Kolb et al. |
| 2024/0191140 | A1 | 6/2024 | Timken et al. |
| 2024/0191142 | A1 | 6/2024 | Timken et al. |
| 2024/0191148 | A1 | 6/2024 | Patel et al. |

FOREIGN PATENT DOCUMENTS

| | | |
|---|---|---|
| EP | 0087277 A2 | 8/1983 |
| EP | 3795656 A1 | 3/2021 |
| EP | 3795660 A1 | 3/2021 |
| EP | 4055118 A1 | 9/2022 |
| EP | 4108738 A1 | 12/2022 |
| EP | 4185662 A1 | 5/2023 |
| FR | 2151473 A5 | 4/1973 |
| GB | 0413637 A | 7/1934 |
| GB | 1153536 A | 5/1969 |
| GB | 1245624 A | 9/1971 |
| TW | 202043331 A | 12/2020 |
| WO | 95/14069 A1 | 5/1995 |
| WO | 2020/112273 A1 | 6/2020 |
| WO | 2021155408 A1 | 8/2021 |
| WO | 2022144627 A1 | 7/2022 |
| WO | 2022220991 A1 | 10/2022 |
| WO | 2022268663 A1 | 12/2022 |
| WO | 2023064816 A1 | 4/2023 |
| WO | 2023215703 A1 | 11/2023 |
| WO | 2024050217 A1 | 3/2024 |

OTHER PUBLICATIONS

Cevada, E., et al., "Novel silicon free defoaming agents, based on alkylacrylates, for petroleum: Effect of the molecular weight on their efficiency", Fuel, vol. 278, Oct. 15, 2020, 10 pages.

International Search Report and Written Opinion issued in related Application Serial No. PCT/US2023/063979 on Jul. 11, 2023.

International Search Report and Written Opinion issued in related Application Serial No. PCT/US2023/064029 on Jun. 22, 2023.

Jones, G. E., et al., "Application of JFA-5 as an Antifouling Additive in a Jet-A Fuel", Ind. Eng. Chem. Res., vol. 35, No. 3, 1996, pp. 837-843.

Non-Final Office Action issued in related U.S. Appl. No. 18/181,043 on Sep. 20, 2024.

* cited by examiner

FOULING MITIGATION OF DELAYED COKER HEATERS

CROSS-REFERENCE TO RELATED APPLICATIONS

This application claims the benefit of U.S. provisional patent application Ser. No. 63/318,558, filed 10 Mar. 2022, entitled "FOULING MITIGATION OF DELAYED COKER HEATERS BY PROCESSING PLASTIC SOLUTIONS," and claims the benefit of U.S. provisional patent application Ser. No. 63/318,571, filed 10 Mar. 2022, entitled "PLASTIC SOLUTION BASED ANTIFOAMING FOR DELAYED COKER," the entire disclosures of which are incorporated herein by reference.

TECHNICAL FIELD

The present disclosure generally relates to petroleum refinement, and more particularly relates to reducing fouling in delayed coker heaters.

BACKGROUND

Crude oil processing involves a wide variety of different processing steps to achieve all the different possible petroleum products, such as liquid petroleum gasses, lubricating oils, gasoline, naphtha, diesel, kerosene, coke, and a wide variety of additional products. Very broadly, major processing steps in oil refinement may include atmospheric distillation, vacuum distillation, and delayed coking. Delayed coking is a process in which residual oil from other refining processes may be thermally cracked to break long chain hydrocarbon residual oils into shorter hydrocarbon chain products, as well as petroleum coke. In very general terms, delayed coking may include heating the long chain hydrocarbon residual oils from other refining process to a temperature that will allow thermal cracking of the long chain hydrocarbons into shorter chain products. One issue that can often interfere with the productivity of the delayed coking process involves the premature coking, or fouling, within heating and transfer pipes associated with the coking process. Fouling within the heating tubes and transfer pipes associated with the coking process may require cleaning, or removal of the fouling from within the tubes and pipes. Such cleaning may require that the coking process be taking off line during the cleaning. As such, the productivity of coking processes may be dictated, at least in part, by the run times that are achievable in between required cleanings.

SUMMARY

According to an implementation, a method of mitigating fouling in a delayed coking unit heater may include forming a plastic mixture including a plastic material and a carrier. The method may also include combining the plastic mixture with a coker feedstock upstream of a coke drum.

One or more of the following features may be included. Forming the plastic mixture may include at least partially dispersing the plastic material in the carrier. Forming the plastic mixture may include at least partially dissolving the plastic material in the carrier. Forming the plastic mixture may include combining the plastic material and the carrier using a high-shear mixer.

The plastic material may include one or more of: polyolefin, polystyrene, polyvinylchloride, waste tire scrap, polyethylene terephthalate, polyester, polyamide, acrylic, and mixtures thereof. The plastic mixture may include between about 5 wt. % to about 50 wt. % plastic material relative to the total mixture. The carrier may include a hydrocarbon carrier. The carrier may include one or more of: light coker gas oil, heavy coker gas oil, vacuum residue, bitumen, atmospheric residue, pitch from a solvent deasphalting unit, pyrolysis fuel oil, diesel, naphtha, fluid catalytic cracking slurry oil, decant oil, aromatic solvents, and mixtures thereof.

Combining the plastic mixture and the coker feedstock may include providing the plastic material at between about 0.5 wt. % to about 30 wt. % of a total of the plastic mixture and the coker feedstock. Combining the plastic mixture and the coker feedstock may include injecting the plastic mixture into the coker feedstock at one or more of: an inlet of a coker heater pass; a crossover of coker heater passes; and a radiant section of a coker heater.

The method may further include heating the plastic mixture. Heating the plastic mixture may include injecting the plastic mixture into one or more coker heater passes at least partially separate from the coker feedstock. Heating the plastic mixture may include injecting the plastic mixture into a dedicated heater or heater pass at least partially separate from the coker heater feedstock. Combining the plastic mixture and the coker feedstock may include combining the heated plastic mixture and the coker heater feedstock.

Heating the plastic mixture may include heating the plastic mixture to a first temperature. The method may further include heating the coker feedstock to a second temperature, the second temperature being lower than the first temperature. Combining the plastic mixture and the coker feedstock may raise the temperature of the coker feedstock above the second temperature prior to introduction of the combined plastic mixture and coker feedstock into the coke drum. The first temperature can be up to about 1000 F. Heating the plastic mixture may include heating the plastic mixture in one or more ceramic coated heater coils. The one or more ceramic coated heater coils may reduce fouling rates of the one or more heater coils.

According to another implementation, a method of mitigating fouling in a delayed coking unit heater may include combining a plastic material with a hydrocarbon carrier to produce a plastic mixture. Combining the plastic material with the hydrocarbon carrier may include one or more of at least partially dissolving the plastic material in the hydrocarbon carrier and at least partially dispersing the plastic material in the hydrocarbon carrier. The method may also include heating the plastic mixture. The method may also include heating a coker feedstock. The plastic mixture and the coker feedstock may be combined. The method may further include transferring the combined plastic mixture and coker feedstock to a coke drum.

One or more of the following features may be included. Heating the plastic mixture may include heating the plastic mixture in a dedicated heater and/or a dedicated heater pass. Heating the plastic mixture may include heating the plastic mixture in a dedicated coker heater pass. Combining the plastic mixture and the coker feedstock may include combining the heated plastic mixture and the coker feedstock. Heating the plastic mixture may include heating the plastic mixture to a first temperature. Heating the coker feedstock may include heating the coker feedstock to a second temperature, the second temperature may be lower than the first temperature.

Heating the plastic mixture and heating the coker feedstock may include combining the plastic mixture and the coker feedstock, and passing the combined plastic material and coker feedstock through at least a portion of one or more coker heater passes. Combining the plastic mixture and the coker feedstock include injecting the plastic mixture into one or more of: an inlet of a coker heater pass; a crossover of coker heater passes; and a radiant section of a coker heater. Injecting the plastic mixture may include one or more of: sequentially injecting the plastic mixture into one of a plurality of coker heater passes at a time; sequentially injecting the plastic mixture into a subset of a plurality of coker heater passes at a time; and injecting the plastic mixture into a plurality of coker heater passes at one or more of the same time and overlapping times.

The plastic material includes from between about 0.5% wt. % to about 30 wt. % of the combined plastic mixture and coker feedstock.

DETAILED DESCRIPTION OF EXAMINER EMBODIMENTS

Figure 1A:
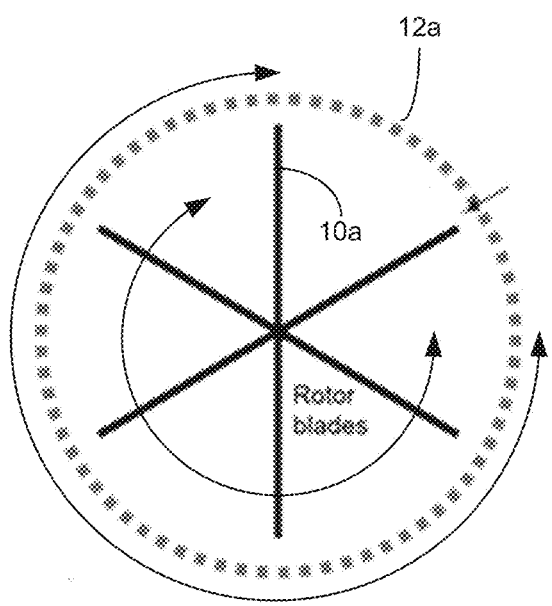
FIGS. 1A and 1B diagrammatically depict example implementations of slotted rotor-stator high shear mixers, consistent with some illustrative embodiments.

In general, the present disclosure may provide systems and methods for mitigating fouling in delayed coking heaters. Consistent with some example embodiments, mitigating fouling within delayed coking unit heaters may include preventing, reducing, and/or decreasing the rate of accumulation of fouling withing delayed coker units, such as within heating and/or transfer pipes of delayed coking heaters, such as pipes/tubes within the heating units by which residual oils are heated and/or transfer pipes between heaters and coke drums. In some implementations, preventing, reducing, and/or decreasing the rate of accumulation of fouling within delayed coking unit heaters may increase the run lengths (e.g., the length of time that the delayed coking unit may be operated between servicing due to fouling). According to some such embodiments, increasing the run length of delayed coking units may improve the economics of such processes (e.g., increase the productive output, either in terms of operating time and/or output of useful products of the delayed coking process, relative to downtime and/or costs necessitated for removal of fouling).

Consistent with an implementation, the present disclosure may provide a method of mitigating fouling in a delayed coking unit heater that may include forming a plastic mixture including a plastic material and a carrier. The method may also include combining the plastic mixture with a coker feedstock upstream of a coke drum. The coker feedstock may include any feedstock which may be conventionally utilized in delayed coker processes, and/or which may be capable of being utilized in delayed coker processes, at least in part, by virtue of the decreased delayed coker unit heater fouling achievable consistent with the present disclosure. Consistent with some implementations, the coker feedstock may include, but is not limited to, one or more of atmospheric distillation residue (also known as atmospheric residue), vacuum distillation residue (also known as vacuum residue), bitumen, pitch from a solvent deasphalting unit, pyrolysis fuel oil, gas oil, fluid catalytic cracking (FCC) slurry oil, decant oil, products and/or by products of other refining processes, raw feedstocks, and the like, as well as mixtures thereof.

Consistent with some example implementations, forming the plastic mixture may include at least partially dispersing the plastic material in the carrier and/or may include at least partially dissolving the plastic material in the carrier. Consistent with some embodiments, the plastic material and the carrier may be mixed to provide a generally homogenous mixture. In other embodiments, the plastic material and the carrier may be mixed to form a heterogenous mixture, with the plastic material being generally uniformly distributed within the carrier. As used herein, generally uniformly distributed may include instances in which there may include some localized concentrations of the plastic material within the carrier, but the plastic material may be generally uniformly distributed within the carrier from a macro perspective. Additionally, in some implementations, the mixture of the plastic material and the carrier may generally form a fluid, e.g., which may allow transfer via pumping or other conveyance through piping or tubing. Herein, the mixture of the plastic material and the carrier may be referred to as a solution, with the understanding that such terminology is intended to include embodiments in which the plastic material is actually at least partially dissolved within carrier, as well as embodiments, in which the plastic material is present as discrete domains dispersed within the carrier, as well as combination thereof. Additionally, herein, the terms piping and tubing may be generally used interchangeably.

Consistent with various embodiments of the present disclosure, the plastic material may include a wide variety of different plastic materials. As used herein, plastic materials may generally refer to any polymeric materials. For example, herein, plastic materials may include, but are not limited to, one or more of polyolefin (e.g., polyethylene, such as HDPE, LDPE, LLDPE, polypropylene, polyolefin elastomers, etc.), polystyrene, polyvinylchloride (e.g., which may include at least partially and/or fully dehydrochlorinated PVC, which may, in some embodiments, exhibit lower corrosivity and/or toxicity), waste tire scrap, polyethylene terephthalate (e.g., PET and/or PETE), polyester, polyamide, acrylic, other plastic material, and mixtures thereof. Consistent with various embodiments, the plastic material may be provided as virgin material, post-consumer material (e.g., recycled and/or reprocessed material), and/or waste material (e.g., which may include mixtures of different materials). Further, the plastic material may be provided having a variety of configurations, such as, but not limited to, fibers, pellets, granules, chunks, shredded material, flakes, and the like, as well as combinations thereof. Consistent with some embodiments, the plastic material may be provided having a size less than about 50 mm. In some embodiments, the plastic material may be provided having a size less than about 6 mm. However, it will be appreciated that the plastic material may be provided having different sizes and/or different configurations. The size and configuration of the plastic material may be selected based upon the type, configuration, and capacity of the equipment utilized for mixing the plastic material with the carrier, as discussed in greater detail below.

Consistent with various embodiments, the carrier may include any suitable fluid that may at least partially dissolve the plastic material, and/or that may at least partially disperse the plastic material. Herein, the carrier may also be referred to as a "solvent," whether the carrier actually dissolves the plastic material or whether the plastic material is only dispersed in the carrier. Consistent with some illustrative example embodiments, the carrier may include a hydrocarbon carrier, such as a hydrocarbon liquid or solvent. For example, in some embodiments, the carrier may include any suitable hydrocarbon fluid, mixture, and/or solvent that may be readily available in a refinery. Examples of such hydrocarbons and/or hydrocarbon mixtures may include, but are not limited to, one or more of light coker gas oil, heavy coker gas oil, vacuum residue, bitumen, atmospheric residue, pitch from a solvent deasphalting unit, pyrolysis fuel oil, diesel, naphtha, fluid catalytic cracking (FCC) slurry oil, decant oil, aromatic solvents, and mixtures thereof. As noted, such carriers may be readily available and/or obtainable in a refinery or other associated complex. In some embodiments, the carrier may additionally and/or alternatively include a material that may not be readily available in a refinery or complex associated with a delayed coker unit, but rather may include a fluid provided specifically for mixture with the plastic material.

Consistent with the foregoing description of the plastic material and the carrier, in some example embodiments a hydrocarbon carrier may at least partially dissolve and/or disperse the plastic material. Further, in some example implementations, one or more of the plastic material and the carrier may be selected based upon, at least in part, the chemical composition of the coker feedstock stream and characteristics of the plastic material and/or the carrier with respect to coking tendency and/or compatibility with the coker feedstock. For example, in some embodiments, the plastic material, the carrier, and/or the mixture of the plastic material and the carrier may exhibit coking (e.g., the formation of solids and/or not readily dissolvable solids, such as petroleum coke) at a similar temperature and/or at a higher temperature than the coker feedstock. Consistent with some such embodiments, the plastic, the carrier, and/or the mixture of plastic and carrier may not tend to coke when heated in the delayed coker heater and/or may tend to coke at a higher temperature than the coker feedstock. Additionally, in some example embodiments, the mixture of the plastic material and the carrier may be generally compatible with the coker feedstock. That is, the mixture of the plastic mixture may tend to at least partially dissolve and/or disperse in the coker feedstock, e.g., as opposed to separating out from the coker feedstock and/or coalescing within the coker feedstock to form macro heterogeneities. Additionally, in some implementations, the plastic mixture may have a viscosity that may be at least generally similar to the viscosity of the coker feedstock at similar temperatures. Consistent with such implementations, the plastic mixture may tend to transit a delayed coker heater in a similar manner as the coker feedstock. In some implementations, a separate pump may be utilized to inject the plastic material into the coker feedstock and/or into the coke drum. Other configurations may also be utilized.

Consistent with various implementations, the plastic mixture may include various concentrations of plastic material. Consistent with various example embodiments, the plastic mixture may include from between about 0.5 wt. % plastic to about 50 wt. % plastic of the total plastic mixture. For example, according to some implementations, the amount of plastic in the plastic mixture may be based upon, at least in part, the availability and type of carrier (e.g., the concentration of plastic material that may be at least partially dissolved and/or at least partially dispersed by the carrier), the availability and capability of equipment to combine the plastic material and carrier, and/or the ability of the pumping and/or transit equipment of the delayed coker unit to process and/or pump the plastic material together with the coker feedstock. These factors may, at least in part, be impacted by the type of plastic material (e.g., with may impact the dissolution and/or dispersion of the plastic material in the carrier), the form of the plastic material (e.g., pellet, granule, fiber, flake, etc., which may also impact the dissolution and/or dispersion of the plastic material in the carrier), the size of the plastic pellets, granules, fibers, flakes, etc., as well as the mixing equipment utilized for forming the plastic mixture.

As noted above, the plastic material may be mixed with the carrier to form the plastic mixture. The plastic material and the carrier may be mixed using any suitable equipment, mechanism, and/or process that may at least partially dissolve and/or at least partially disperse the plastic material within the carrier. For example, in an illustrative example embodiment, forming the plastic mixture may include combining the plastic material and the carrier using a high-shear mixer. For example, high-shear mixing equipment may be utilized in either an in-line continuous mixing process (e.g., in which the plastic mixture may be provided generally continuously) and/or a batch mixing process (e.g., in which the plastic mixture may be provided in batches, which may be subsequently utilized after formation of the batch of plastic mixture). Consistent with some example implementations, the high-shear mixing equipment may relatively rapidly achieve a generally and/or substantially homogeneous plastic mixture (e.g., with or without the need for additional mixing vessels). In some implementations, the plastic mixture may be achieved by processing liquid and solid material (e.g., which may respectively include, but is not limited to, the carrier and the plastic material) through a combination of high-speed slotted rotor/stator mixers which may generate relatively and/or very high hydraulic shear and moderate mechanical shear.

Figure 1B:
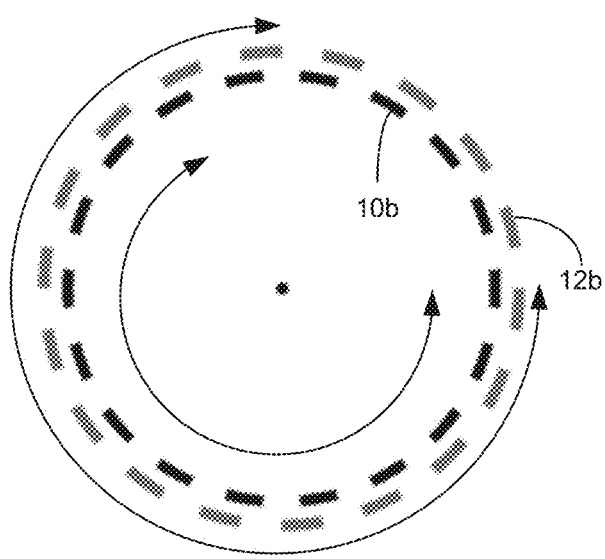

For example, and referring to FIGS. 1A and 1B, two illustrative examples of slotted rotor/stator high-shear mixers are diagrammatically depicted. As shown, the high shear mixers may include rotors (e.g., radial bladed and/or serrated rotor 10a and slotted cylindrical rotor 10b) and stators (e.g., slotted cylindrical stators 12a, 12b) that may rotate relative to one another, either causing the plastic material and carrier to be passed through the mixer, and/or which the plastic material and the carrier are passed through the mixer, e.g., as a result of being pumped, or otherwise conveyed, through the mixer. The rotor and stator may rotate relative to one another, e.g., with one of the rotor and stator remaining stationary while the other of the rotor and the stator are rotated, by rotating the rotor and stator in opposite directions relative to one another, and/or by rotating the rotor and stator in the same direction as one another, but at different speeds from one another. It will be appreciated that while the illustrated high-shear mixers depict only a single rotor and a single stator, in some implementations multiple rotor/stator stages may be utilized to achieve the desired mixing of the plastic material and the carrier.

Consistent with some embodiments, one or more of the plastic material and the carrier may be heated prior to, and/or during, mixing of the plastic material and the carrier. For example, consistent with one illustrative example embodiment, the carrier, at the inlet to the high-shear mixing equipment, may be a minimum temperature in the range of between about 400-450° F. (e.g., which may, in some embodiments, be dependent upon achieving a desired viscosity of the mixture). It will be appreciated that the temperature of the carrier, as provided at the inlet of the high-shear mixer for mixing with the plastic material, may be selected based upon, at least in part, the nature of the carrier, as well as the nature of the plastic material. For example, in some implementations, some hydrocarbon solvents that may be readily available in a refinery may become viscous below about 350° F. when mixed with plastic material as a carrier. The viscosity of such a plastic mixture may pose a problem, e.g., for pumping and/or otherwise conveying to and/or through the delayed coker heater, for mixing with the coker feedstock, etc. Accordingly, in some such embodiments, the carrier may be mixed with the plastic material at a relatively higher temperature (e.g., between about 400-450° F.) at which the mixture may have a relatively lower viscosity that may facilitate efficient processing. As such, and as noted above, the temperature level may be based, at least in part, on the practicality of mixing the carrier and the plastic material in consideration of the viscosity of the mixture at various temperatures. As such the exact temperature level may vary depending upon the solvent and type of plastic material. Accordingly, it will be appreciated that in various embodiments, the temperature of the carrier, when mixed with the plastic material, may be less than about 400° F. and/or may be greater than about 450° F.

According to various embodiments consistent with the present disclosure, combining the plastic mixture and the coker feedstock may include injecting the plastic mixture into the stream of coker feedstock upstream of one or more coke drums associated with the delayed coking process. Consistent with the present disclosure, injecting the plastic mixture into the stream of coker feedstock upstream of one or more coke drum associated with the delayed coking process may include one or more of pumping a flow of the plastic mixture into a flow of the coker feedstock and pumping a flow of the plastic mixture into a delayed coker unit process (and/or a modified delayed coker unit process), with the flow of the plastic mixture subsequently being combined with a flow of coker feedstock. For example, in an illustrative example embodiment, combining the plastic mixture and the coker feedstock may include injecting the plastic mixture into the coker feedstock at one or more of an inlet of a coker heater pass, a crossover of a coker heater pass, and a radiant section of a coker heater.

Figure 2:
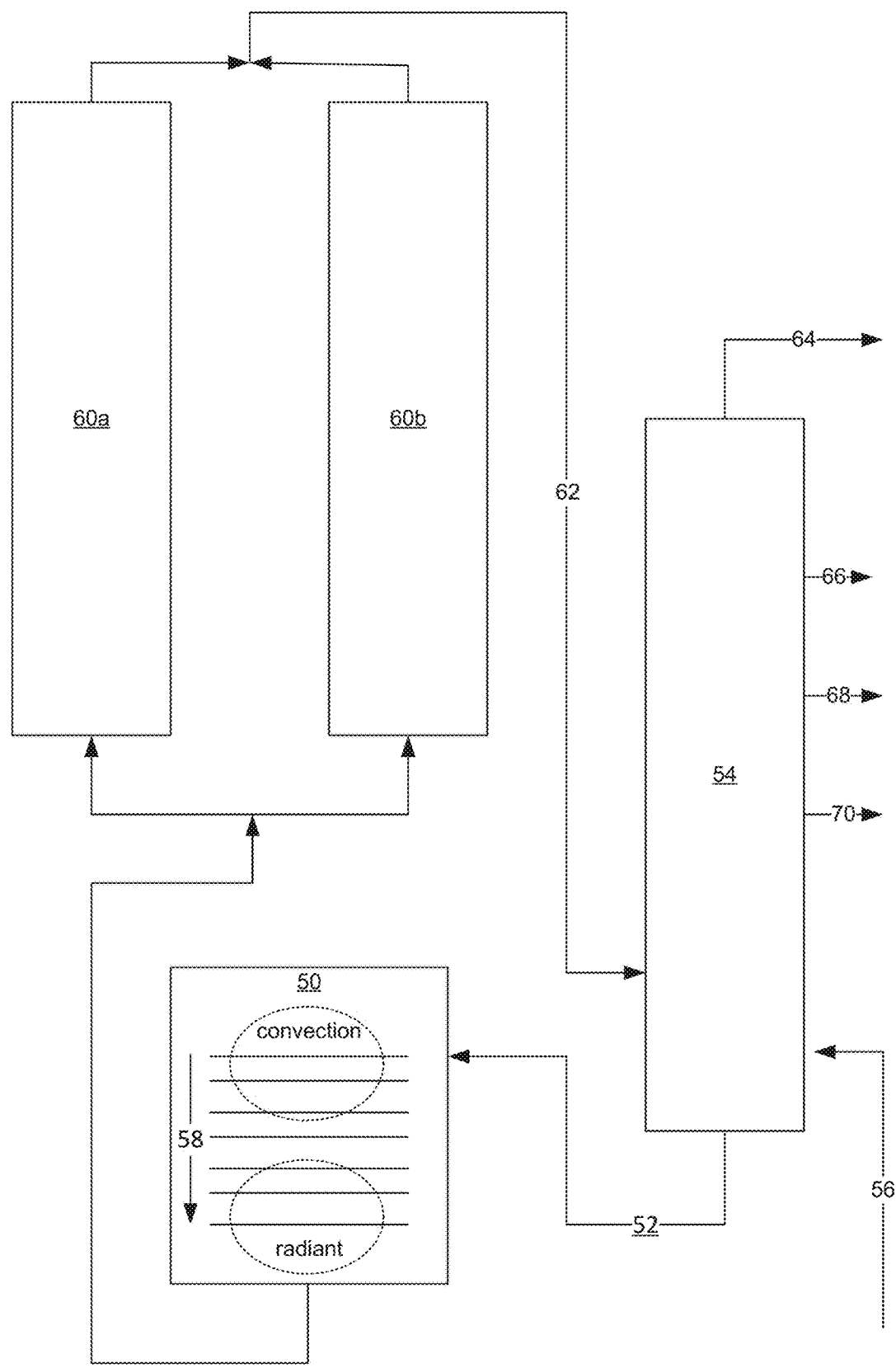
FIG. 2 diagrammatically depicts an example delayed coker system consistent with some implementations of the present disclosure.

For example, and referring also to FIG. 2, an illustrative example embodiment of a delayed coker configuration, as will be appreciated by a person of ordinary skill in the art, is generally shown. As generally shown, coker heater 50 may receive a flow of feedstock 52 from coker fractionator 54. While coker heater 50 is shown receiving the flow of feedstock 52 from fractionator 54, it will be appreciated that the coker heater 50 may receive the flow of feedstock from other sources, including, but not limited to, other refinery processes, such as atmospheric distillation, vacuum distillation, other cracking processes, etc. Such additional and/or alternative source 56 of coker feedstock is generally depicted as an inflow to fractionator (which may, in some implementations, preheat the feedstock). However, such depiction is for illustrative purposes only, and such additional and/or alternative source 56 of coker feedstock may not flow through and/or combine with feedstock from fractionator 54. Consistent with some example embodiments of the present disclosure, the coker heater 50 may include an Amec Foster Wheeler proprietary delayed coker heater, and/or may include any other suitable delayed coker heater.

The flow of feedstock 52 may be received at coker heater 50 and may be heated to a desired temperature. For example, as schematically depicted, the coker heater 50 may include one or more pipe runs (passes) through the heater, during which the coker feedstock may be heated to a desired temperature (e.g., which may be at and/or above a desired thermal cracking temperature for the feedstock). In some implementations, as generally shown, the coker heater 50 may include multiple discrete heater runs (passes), each of which may convey a respective stream of coker feedstock through the heater to be heated to the desired temperature. As also generally depicted, in some implementations, the coker heater may include various different sections (e.g., which may experience different heating temperatures and/or profiles). For example, the coker heater may include one or more convection heating sections and one or more radiant heating sections. It should be appreciated that the depiction of the convection heating section(s) and the radiant heating section(s) is intended for illustrative purposes, and is not intended to depict the relative location, size, and/or arrangement of the heating sections within the coker heater. As shown, in some implementations, heater runs (passes) within the different heater sections may be connected by one or more crossovers (e.g., crossover 58), which may allow coker feedstock to traverse from one heater section to another heater section (e.g., to be exposed to different heating temperatures and/or different heating profiles). While only one crossover is diagrammatically depicted, it will be appreciated that in some embodiments, each heater pass may include a separate crossover tube connecting heater passes in each of the various regions of the coker heater. According to some such implementations, the coker heater may include as many crossovers as passes in each respective region.

The coker feedstock, heated to a desired temperature for thermal cracking may be transferred from the coker heater 50 to a coke drum (e.g., coke drums 60a, 60b). As is generally known, delayed coking process may generally include two, or more, coke drums, e.g., with one coke drum being online for receiving the heated coker feedstock, while the other coke drum may be offline for removal of accumulated coke, cleaning, etc. The coker feedstock received by the online coke drum may generally be cracked with vapor phase 62 being directed to the fractionator 54, and solid and/or liquid phases being collected in the coke drum. The vapor phase 62 may be separated in the fractionator 54 into various components, such as, but not limited to, gaseous phases 64, naphtha 66, LCGO (light coker gas oil) 68, HCGO (heavy coker gas oil) 70, and/or various additional and/or alternative products. It will be understood by those of skill in the art that the preceding depiction and description of a delayed coking configuration is intended for the purpose of illustration and that various additions, omissions, and/or alternations may be applied.

Continuing with the foregoing, consistent with an illustrative example embodiment, combining the plastic mixture and the coker feedstock may include injecting the plastic mixture into the coker feedstock at one or more of: an inlet of a coker heater pass (e.g., a portion of the heater tube at which coker feedstock is received), a crossover of coker heater passes (e.g., an interconnection between two of more heater passes, including, but not limited to, an interconnection of one or more heater passes in the convection section and one or more heater passes in the radiant section), and a radiant section of a coker heater. For example, and with additional reference to FIG. 3, an illustrative example configuration for mitigating delayed coker heater fouling is generally diagrammatically depicted. As shown, plastic material 101 may be mixed with a carrier 102 using a high-shear mixer 103, as generally discussed above. Mixing the plastic material and the carrier using the high-shear mixer may at least partially dissolve and/or at least partially disperse the plastic material in the carrier. Consistent with some implementations, fluid motion of the carrier and/or of the carrier and the at least partially dissolved and/or at least partially dispersed plastic material may enhance external mass and heat transfer around plastic material particles. In some implementations, dispersion mechanisms may include combinations of hydraulic shear and mechanical shear, e.g., which may facilitate dispersion and/or dissolution of the plastic material in the carrier, e.g., to form a generally consistent homogeneous mixture having a generally uniform viscosity and thermal mass.

As discussed above, in some embodiments, the carrier may be heated prior to mixing with the plastic material. In some such embodiments, the temperature of the carrier may be at, and/or above, a melting temperature of the plastic material. In some such embodiments, the plastic material may partially and/or fully melt during mixing with the carrier. The partial and/or full melting of the plastic material in the carrier may be enhanced and/or facilitated by the high-shear mixing of the plastic material and the carrier. Further, in some embodiments, melting of the plastic material may continue as the plastic material disperses and/or dissolves in the carrier. Hydraulic shear may, in some embodiments, stretch and fold the increasingly viscous fluid created by the originally solid plastic material, and mechanical shear may additionally break the solid plastic particles into smaller particles. As discussed above, heat may be supplied by the solvent, as well as by suitable external means, as well as by the frictional forces created by the high-shear mixing equipment. In some embodiments, exceeding critical maximum film temperatures may be avoided, which may, thereby, avoid the plastic material from initiating cracking before being injected to the delayed coking process.

Figure 3:
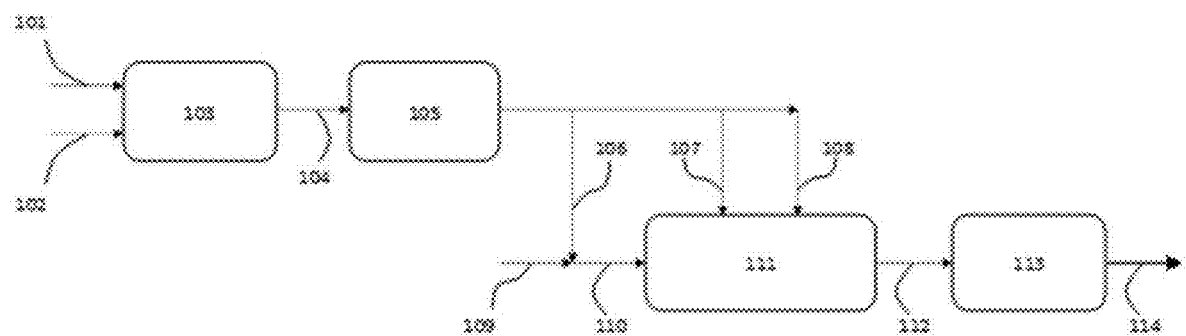
FIG. 3 diagrammatically depicts an illustrative example embodiment of a fouling mitigation configuration consistent with the present disclosure.

With continued reference to FIG. 3, the plastic mixture 104 may be processed by a plastic mixture injection pump 105, which may provide a pressurized plastic mixture 106. The pressurized plastic mixture 106 may be injected along with the rest of the coker feedstock 109 into one or more of the delayed coker heater passes 111. In some such implementations, injecting the plastic mixture along with the rest of the coker feedstock may include injecting the plastic mixture into a stream of the coker feedstock in one or more delayed coker heater passes, crossover tubes, etc. According to such an implementation, injecting the plastic mixture along with the rest of the coker feedstock may combine the plastic mixture with the coker feedstock. Consistent with some implementations of the present disclosure, benefits may be realized in, for example, the coker heater pass or passes where the injection is performed. Consistent with various embodiments, the injection of the plastic mixture may occur at an inlet to the heater 110, at the heater crossover line 107, at an identified location of the heater radiant section 108, and/or at any convenient combination of any of locations. As diagrammatically depicted, a coker heater transfer line 112, may transfer the coker feedstock, including the plastic mixture, to an active coke drum(s) 113 and coke drum overhead stream which is directed to the rest of the delayed coking unit 114 (e.g., the fractionator and/or other portions of the delayed coking unit).

Consistent with some example embodiments, injecting the plastic mixture into one or more heater passes may include sequentially injecting the plastic mixture into one of the heater passes at a time and/or sequentially injecting the plastic mixture into a subset of the heater passes at a time. For example, if injection of the plastic mixture is carried out in a single heater pass, the heater pass with plastic mixture injection may be cycled accordingly (e.g., plastic mixture may be sequentially injected in one, or a subset of the total number of heater passes, at a time, and then subsequently injected into a different heater pass and/or different subset of the heater passes). In some embodiments sequentially cycling injection of the plastic mixture into different heater passes may occur at time intervals that may be, at least in part, dictated by rising tube metal temperatures (Tube Metal Temperature, or TMT, which may be the temperature of the metal heater pass tubes), to ensure the run length of all coker heater passes can be extended before maximum allowable TMTs are reached. In some embodiments consistent with the present disclosure, cycling of the injection of the plastic mixture into different heater passes may be done manually, or it may be done automatically, with a properly controlled sequence, attending to the degree of increase of TMTs of each pass, and expected times remaining until next decoking (i.e. on-line spalling, pigging, etc.). Consistent with some such implementations, the TMT of the various heater passes may be monitored. Additionally and/or alternatively, cycling of the injection of the plastic mixture may be based, at least in part, upon a time-wise schedule. In some such embodiments, the time-wise schedule may be based, at least in part, on previously (and/or continuously) collected data concerning TMT changes over time with respect to plastic mixture injection.

Consistent with some embodiments, and, for example, depending on the carrier used (which may be, for example, be, at least in part, dependent on the total amounts of plastic material dissolved), injection may happen to all coker heater passes simultaneously. In some such implementations, cycling of injection locations may not be necessary. An end user skilled in the art can decide optimum amounts of plastic to be used for the purposes of reducing heater fouling, as well as selecting the proper carrier to be used, based on the expected total viscosity of the plastic mixture.

Consistent with some implementations, the plastic mixture may be heated. As generally described above, in some implementations, the plastic mixture may be heated by injecting the plastic mixture into one or more coker heater passes along with the rest of the coker feedstock. Consistent with such an embodiment, the plastic mixture may combine with the coker feedstock, and the combined plastic mixture and coker feedstock may traverse at least a portion of the coker heater (e.g., pass through at least a portion of one or more coker heater passes), which may serve to heat the plastic mixture (e.g., along with the coker feedstock). Consistent with some implementations, heating the plastic mixture may include at least partially heating the plastic mixture prior to combining the plastic mixture with the coker feedstock. As generally discussed above, in some implementations the carrier may be heated prior to mixing with the plastic material to form the plastic mixture. Further, in some implementations the plastic mixture may be further heated prior to combining with the coker feedstock.

According to an illustrative example embodiment, heating the plastic mixture may include injecting the plastic mixture into one or more coker heater passes at least partially separate from the coker feedstock. In some embodiments, this may include heating the plastic mixture in a dedicated heater pass of the coker heater. For example, the coker feedstock may be conveyed through one or more heater passes of the coker heater, but not through at least one or more other heater passes of the coker heater. Correspondingly, the plastic mixture may be injected into one or more of the heater passes through which the coker feedstock is not conveyed. As such, during initial injection of the plastic mixture into a heater pass, the plastic mixture may be at least partially separate from and/or not combined with the coker feedstock. Consistent with some such implementations, the plastic mixture may be at least partially heated while passing through the heater passes of the coker heater. Further, in some embodiments, the plastic mixture may be combined with the coker feedstock within the coker heater. For example, at passing through at least a portion of the coker heater separate from the coker feedstock, the plastic mixture may be combined with the coker feedstock in another portion of the coker heater. In various embodiments, the combined plastic mixture and coker feedstock may directly exit the coker heater (e.g., combination of the plastic mixture and the coker feedstock may occur at and/or proximate to an exit from the coker heater). In some embodiments, the combined plastic mixture and coker feedstock may further traverse at least another portion of the coker heater. In such an implementations, the combined plastic mixture and coker feedstock may be further heated together within the coker heater prior to exiting the coker heater. Consistent with some implementations, and as described in greater detail below, according to various implementations, when the plastic mixture and the coker feedstock are combined, the plastic mixture may be at a higher temperature than the coker feedstock. Further, in some other embodiments, when the plastic mixture is combined with the coker feedstock the plastic mixture may be at the same temperature as the coker feedstock, and/or the plastic mixture may be at a lower temperature than the coker feedstock.

In some additional illustrative example embodiments, heating the plastic mixture may include injecting the plastic mixture into a dedicated heater that may be at least partially separate from the coker heater feedstock. Consistent with such an implementation, the plastic mixture may be heated in a separate heater and/or an at least partially separate portion of the coker heater than the coker feedstock. Consistent with some such implementations, the temperature of the plastic mixture may be separately controlled prior to mixing with the coker feedstock. For example, in such an implementation, the plastic mixture may be heated to a temperature that may be greater than the temperature to which the coker feedstock is heated (e.g., by the coker heater). For example, in some implementations, (and equally applicable to any of the foregoing examples, including, but not limited to, example in which the plastic mixture is injected into at least partially separate heater passes of the coker heater, relative to the coker feedstock) depending upon the makeup of the plastic material and of the carrier, the plastic mixture may have one or more of a higher thermal cracking temperature, a higher coking temperature, and/or a higher fouling temperature than the coker feedstock. As such, it may be possible to heat the plastic mixture to a higher temperature than the coker feedstock without causing undesirable fouling of heater passes. Accordingly, consistent with some such implementations, the plastic material may have an outlet temperature from the dedicated heater (and/or from one or more at least partially separate heater passes of the coker heater) that may be higher than the outlet temperature of the coker feedstock from the coker heater (and/or than the coker feedstock at combination with the plastic mixture). Consistent with the foregoing examples of injecting the plastic mixture into at least partially separate heater passes of the coker heater and/or utilizing an at least partially separate and/or dedicated heater for the plastic mixture, combining the plastic mixture and the coker feedstock may include combining the heated plastic mixture and the coker heater feedstock.

Figure 4:
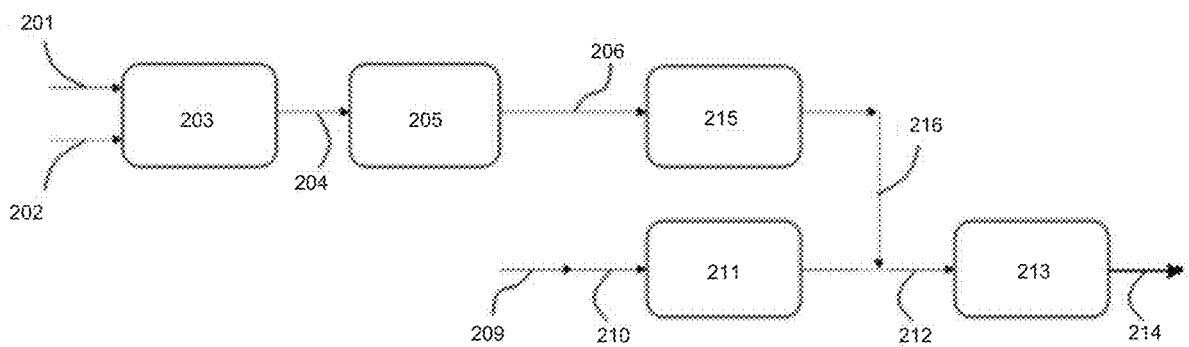
FIG. 4 diagrammatically depicts another illustrative example embodiment of a fouling mitigation configuration consistent with the present disclosure.

Continuing with the foregoing, and referring also to FIG. 4, and illustrative example embodiment is diagrammatically depicted in which the plastic mixture is injected into a separate delayed coker heater pass or passes or into a separate heater altogether, with the plastic mixture subsequently being conveyed to a coker heater transfer line and to the coke drum and rest of the delayed coking unit. As depicted in the illustrative example embodiment, plastic material (e.g., a solid plastic waste or virgin plastic material) 201 is mixed and at least partially dissolved and/or dispersed into a temperature controlled (e.g., as generally discussed above) carrier 202 (e.g., which may include, but is not limited to a hydrocarbon solvent), utilizing specifically tailored high-shear mixing equipment 203. Fluid motion may enhance the external mass and heat transfer around the plastic material (e.g., the pellets, granules, particles, fibers, etc.). The dispersion mechanisms may include a combination of hydraulic shear with mechanical shear. As the particles, etc., of the melting solid plastic material continue to dissolve and/or disperse, hydraulic shear may be useful and/or facilitate stretching and/or folding the increasingly viscous fluid created by the solid plastic material, and mechanical shear may be facilitate breaking the solid plastic material particles into smaller particles. Heat may be supplied by the carrier (e.g., which may be heated to an initial temperature prior to mixing with the plastic material, as generally discussed above), as well as by suitable external means, as well as by the frictional forces created by the mixing equipment. Critical maximum film temperatures may typically not be exceeded, to avoid the plastic material from initiating cracking before being injected to the process. The plastic mixture formed 204, may be processed by the plastic mixture injection pump 205, and the pressurized plastic mixture 206 may be injected into one or more of the delayed coker heater passes or into a separate heater 215. In some implementations, the separate heater passes may include ceramic coated heater coils, which may, e.g., resist fouling to at least some degree. Consistent with some implementations of the present disclosure, benefits may be realized in, for example, the rest of the coker heater passes 211. The injection of the totally or partially cracked plastic mixture 216 may take place at a convenient location on the coker heater transfer line 212. From there the combined stream of the heater coker feedstock and the heated plastic mixture may be routed to the coke drum(s) 213 to drive reactions to completion, and the coke drum overhead stream is directed to the rest of the delayed coking unit 214.

Consistent with the foregoing, and as generally described above, in some embodiments, heating the plastic mixture may include heating the plastic mixture to a first temperature. Additionally, heating the coker feedstock may include heating the coker feedstock to a second temperature, in which the second temperature is lower than the first temperature. Combining the plastic mixture and the coker feedstock may raise the temperature of the coker feedstock above the second temperature prior to introduction of the combined plastic mixture and coker feedstock into the coke drum. In some example implementations, the relatively higher coil outlet temperature of the plastic mixture stream may be such that it enables a reduction of the rest of the coker heater passes (e.g., including a lower heating temperature of the coker feedstock), thereby mitigating coker heater fouling, while at the same time maintaining coke drum feed inlet temperature. In some embodiments, the higher coil outlet temperature of the plastic mixture stream may be such that while keeping the same outlet temperature of the rest of the coker heater passes an increase in coke drum feed inlet temperature is achieved, thereby allowing an effective increase in overall delayed coking unit liquid yields. Consistent with some illustrative example embodiments, the first temperature may be up to about 1000° F., or higher (e.g., depending upon the thermal cracking, coking, degradation, and/or fouling temperature of the plastic mixture). As generally discussed above, in some implementations, heating the plastic mixture may include heating the plastic mixture in one or more ceramic coated heater coils. The one or more ceramic coated heater coils may reduce fouling rates of the one or more heater coils.

For example, and consistent with the various illustrative embodiments above, the plastic mixture may be heated to the same temperature as the coker feedstock, and/or the plastic mixture may be heated to a different temperature than the coker feedstock. For example, consistent with some example embodiments, by selecting a higher coil outlet temperature (i.e., the outlet temperature of a heater pass), e.g., which may be up to about 1000° F., or higher, for the plastic mixture that is routed via an independent heater pass or independent heater, the temperature of the remaining passes (e.g., which may, in some implementations only be heating coker feedstock) can be lowered correspondingly, while still achieving the same coke drum feed inlet temperature. That is, combining the plastic mixture having a relatively higher temperature and the coker feedstock having a relatively lower temperature may result in a combined plastic mixture/coker feedstock stream that may have a desired coke drum inlet temperature. This can substantially increase heater run length. For example, and as will be discussed in greater detail below, heating the coker feedstock to a lower temperature (which may be possible due to the subsequent heating resulting from being combined with the relatively higher temperature plastic mixture) may result in the coker feedstock being below a thermal cracking, coking, and/or fouling temperature (are at temperatures resulting in a lesser degree thereof) while transiting the coker heater (e.g., the various heater passes within the coker heater). Consistent with some illustrative example embodiments, and as generally indicated above, in some embodiments the separate heater pass may be part of the existing heater, may be an additional fired-heater pass added for this purpose, or may be a completely separate heater. This ad-hoc heater may be of any suitable type: fossil-fuel fired or electric, such as based on electromagnetic heating (induction, infrared, microwave, etc.) or heating by electrical resistances.

Consistent with some illustrative example embodiments, combining the plastic mixture and the coker feedstock may include providing the plastic material at between about 0.5 wt. % to about 30 wt. % of a total of the plastic mixture and the coker feedstock. That is, for example, the plastic material may make up between about 0.5 wt. % of the total material provided to the coke drum to about 30 wt. % of the total material provided to the coke drum. Herein, the foregoing range is considered to include all subranges and individual weight percent contents of the plastic material, as a total of the material provided to the coke drum, within the identified range.

According to the foregoing illustrative example implementations and principles discussed above, consistent with some implementations the present disclosure may provide a method of mitigating fouling in a delayed coking unit heater.

The method of mitigating fouling in the delayed coking unit heater may include combining a plastic material with a hydrocarbon carrier to produce a plastic mixture. Combining the plastic material with the hydrocarbon carrier may include one or more of at least partially dissolving the plastic material in the hydrocarbon carrier and at least partially dispersing the plastic material in the hydrocarbon carrier. The plastic mixture may be heated, and a coker feedstock may also be heated, either together or at least partially separately. The plastic mixture and the coker feedstock may be combined, and the combined plastic mixture and coker feedstock may be transferred to a coke drum.

Additionally, and as generally described above, consistent with some implementations, heating the plastic mixture may include heating the plastic mixture in a dedicated heater and/or heating the plastic mixture in a dedicated coker heater pass. Further, combining the plastic mixture and the coker feedstock may include combining the heated plastic mixture and the coker feedstock. In some particular example implementations, the plastic mixture may be heated to a first temperature, and the coker feedstock may heated to a second temperature, that may be lower than the first temperature. In some implementations, heating the plastic mixture and heating the coker feedstock may include combining the plastic mixture and the coker feedstock, and passing the combined plastic material and coker feedstock through at least a portion of one or more coker heater passes. In some implementations, combining the plastic mixture and the coker feedstock include injecting the plastic mixture into one or more of: an inlet of a coker heater pass; a crossover of coker heater passes; and a radiant section of a coker heater. Injecting the plastic mixture may include one or more of: sequentially injecting the plastic mixture into one of a plurality of coker heater passes at a time; sequentially injecting the plastic mixture into a subset of a plurality of coker heater passes at a time; and injecting the plastic mixture into a plurality of coker heater passes at one or more of the same time and overlapping times. The plastic material may include from between about 0.5% wt. % to about 30 wt. % of the combined plastic mixture and coker feedstock.

Consistent with the foregoing, in some experimental implementations it has been found that when plastic materials are dispersed and/or dissolved into carrier (e.g., such as a hydrocarbon solvent, or other suitable carrier), and then added to, and processed through, a delayed coker heater pass, the heater run length (e.g., the length of time that the heater may be operated before requiring cleaning or maintenance due to fouling or the like), may be expected to increase. While not intending to be limited to any specific mode or theory of operation, the increase in run length may be, due, at least in part, to factors that may include, but are not limited to:

The total asphaltene content of that pass may be diluted, e.g., due to the addition of plastic material, since the plastic materials typically may not contain asphaltenes (additionally and/or alternatively, the asphaltene content in the combined feedstock and plastic mixture may be greatly reduced in an implementation in which a carrier other than vacuum residue is employed).

The plastic materials may generally barely produce any coke from thermal cracking (and/or may produce less and/or substantially less coke from thermal cracking as compared to the coking feedstock) and therefore may not significantly contribute to coking of the tubes.

The plastic materials may decompose almost entirely into liquid and gas, and may decompose at a faster rate, compared to, e.g., vacuum residue. In some example embodiments, the introduction of plastic materials may in turn contribute to an increase in the process fluid velocity in that pass.

Experimental examination has suggested that heater coils processing plastic mixtures tend to foul slower and/or significantly slower than heater coils processing regular coker feedstock, at equivalent processing conditions, and even at higher outlet temperatures. For example, Table 1 shows the results of coker heater fouling data obtained in pilot plant runs.

TABLE 1

| Material | Coil Outlet Temperature (° F.) | Relative Fouling (%) |
|---|---|---|
| Vacuum Residue (VR) | 920 | 100 |
| VR + 5 wt % Plastic | 920 | 94 |
| HCGO + 15 wt % Plastic | 920 | 18 |
| HCGO + 15 wt % Plastic | 970 | 68 |
| HCGO + 7.5 wt % Plastic | 970 | 61 |
| HCGO | 970 | 10 |

As shown above, it was observed that depending upon the carrier utilized and the concentration of the plastic material, fouling rates in coker heater passes may be reduced. The reduction of fouling rates may even, in some implementations, be observed at higher heating temperatures.

As generally discussed above, consistent with some embodiments of the present disclosure, specifically-tailored and/or selected high-shear mixing equipment may be used for in-line and/or continuous mixing or batch processing of plastic material with a carrier, such as, but not limited to, a hydrocarbon mixture. In some implementations, the high-shear mixing equipment may achieve rapid formation of a generally and/or substantially homogeneous plastic mixture (i.e., mixture of the plastic material and the carrier). In some implementations, the high-shear mixers may achieve the generally and/or substantially homogeneous plastic mixture with or without the need for additional mixing vessels. In some implementations, as a result, at least in part, of the homogeneous mixture, a uniform heat distribution can be achieved in the coker heater tubes (e.g., due at least in part to the complete mixing of solid plastic in the carrier), which may, in some implementations, facilitate effective mass and heat transfer. This in turn may, in some implementations, facilitate obtaining a valuable and narrow product distribution from thermal cracking of plastic material. In some illustrative embodiments, this may be achieved by means of dissolving and/or dispersing the plastic material in the carrier, and heating the plastic mixture up to between about 900° F.-1000° F. in an Amec Foster Wheeler proprietary coker heater, and/or any other suitable delayed coker heater.

Consistent with some experimental implementations, it has been found that, according to some embodiments consistent with the present disclosure, one or more of the following additional benefits may be realized from utilizing plastic materials to reduce coker heater fouling in a delayed coker:

a) An improvement in coke drum quenching efficiency (e.g., a reduction of hot spots) may be expected, due, at least in part, to a more uniform coke porosity related to the rapid cracking of plastic material in the coke drum.

b) A reduction in coke drum foaming may be associated with the plastic materials cracking with faster kinetics than the other feedstock components at equivalent temperatures (e.g., having much lower residence time in the drum), and not contributing to the formation of a highly viscous liquid mesophase (which may be a main player in the formation of stable reactive foams), as compared to typical delayed coker feedstocks.

c) The coke yield may decrease significantly (e.g., if sufficient delayed coker feed is partially replaced with plastic material). Therefore, increased cycle times may be possible at equivalent capacities. An extension in cycle time at equivalent capacity may allow for increased quench and warmup durations, thus increasing coke drum life. Additionally/alternatively, adding plastic materials to the delayed coker may be a way of unlocking additional liquid yields when the coke drums are coke-make limited.

d) The liquid yields may increase significantly (e.g., if sufficient delayed coker feed is partially replaced with plastic material).

e) Increased cetane number of diesel fraction may be expected (e.g., especially with polypropylene polymers), due to, at least in part, an increase in paraffinicity.

f) Increased octane number of naphtha fraction may be expected, due to increased content of iso-paraffins (e.g., especially when processing polypropylene), and expected presence of ethyl tert-butyl ether or ETBE (especially when processing polystyrene).

g) Increased liquid yields, by processing plastic mixture injection in a separate heater or heater pass, with a coil outlet temperature that is higher than the other passes in coking service (anywhere up to about 1000° F.), thereby allowing an effective increase in coke drum feed inlet temperature.

In some implementations, the present disclosure may provide a means to handle delayed coker heater fouling in delayed coking units, with the added benefit of increased liquid yields, e.g., due, at least in part, to thermal cracking of the plastic materials and potential for improved product properties by co-processing plastic material. For example, and referring also to Table 2 below, potential fouling reductions that may be achieved while increasing outlet coil temperature of the separate pass or heater processing the plastic mixture and at the same time decreasing the outlet temperature of the other passes in coking service (e.g., as the combination of the plastic mixture may increase the temperature of the combined plastic mixture and coker feedstock to a desired coke drum inlet temperature). A reduction in coil outlet temperature may, in some embodiments, entail a lower radiant heat flux as well as lower tube metal temperature and film temperatures, which may result in increased heater run lengths.

TABLE 2

| Basis: 4-Pass Coker Heater | | | | |
|---|---|---|---|---|
| Normal Coker Heater Outlet Temperature (° F.) | Coil Outlet Temperature for passes in Coking Service (° F.) | Coil Outlet Temperature for Plastic mixture (° F.) | Combined Transfer Line Temperature (° F.) | Estimated Run Length Increase (*) (%) |
| 925 | 925 | N/A | 925 | 100 |
| 925 | 920 (5° F. lower) | 955 | 925 | 120-140 |
| 925 | 915 (10° F. lower) | 970 | 925 | 170-190 |
| 925 | 910 (15° F. lower) | 985 | 925 | 240-260 |

TABLE 2-continued

Basis: 4-Pass Coker Heater

| Normal Coker Heater Outlet Temperature (° F.) | Coil Outlet Temperature for passes in Coking Service (° F.) | Coil Outlet Temperature for Plastic mixture (° F.) | Combined Transfer Line Temperature (° F.) | Estimated Run Length Increase (*) (%) |
|---|---|---|---|---|

The Estimated Run Length Increase (*) may include an estimated number, wherein the value may depend, at least in part, on one or more of the nature of the vacuum residue, flowrate through each pass, actual operating conditions, velocity medium injection to the heater, etc.

Referring also to Table 3 below, potential liquid yield increase is outlined that may be achieved while increasing outlet coil temperature of the separate pass or heater processing the plastic mixture and maintaining the outlet temperature of the other passes in coking service.

TABLE 3

Basis: 4-Pass Coker Heater

| Normal Coker Heater Outlet Temperature (° F.) | Coil Outlet Temperature for passes in Coking Service (° F.) | Coil Outlet Temperature for Plastic mixture (° F.) | Combined Transfer Line Temperature (° F.) | Estimated DCU C5+ Liquid Yield Increase (*) (**) |
|---|---|---|---|---|
| 925 | 925 | 945 | 928 (+3° F.) | 0.26-0.38 wt % |
| 925 | 925 | 965 | 933 (+8° F.) | 0.62-0.92 wt % |
| 925 | 925 | 985 | 938 (+13° F.) | 1.02-1.52 wt % |
| 925 | 925 | 1,000 | 940 (+15° F.) | 1.24-1.86 wt % |

The estimated DCU C5+ liquid yield increase (*) may be in addition to liquid yield increase provided by processing plastics. Additionally, the estimated DCU C5+ liquid yield increase (**) is an estimated value. The actual number may depend, at least in part, on the nature of the vacuum residue, flowrate through each pass, and/or actual operating conditions (pressure, temperature, etc.).

As generally discussed above, suitable coker feedstock material may consist of a wide variety of petroleum product, some or all of which may result from previous refining processes. For example, suitable coker feedstock may include, but is not limited to, vacuum residue, bitumen, atmospheric residue, pitch from a solvent deasphalting unit, pyrolysis fuel oil, gas oil, FCC slurry oil, decant oil or mixtures of any of these. Composition and property ranges consistent with some embodiments of the present disclosure are indicated on TABLE 4 below:

TABLE 4

| Property | Value Proposed | Unit |
|---|---|---|
| CCR (Conradson Carbon Residue) | 3 to 48 | wt % |
| API (American Petroleum Institute) gravity | −12 to 40 | ° (degrees) |
| TBP (True Boiling Point) | 330+ to 700+ | ° C. |

Herein various embodiments, and implementations have been discussed, including various individual features and combinations of features. It will be appreciated that various additional and/or alternative embodiments may be realized consistent with the foregoing description. For example, the features, aspects, advantages, and/or attributes of the variously described embodiments and implementations may be provided in combinations in addition to those specifically discussed. Similarly, various features, aspects, and/or attributes of one embodiment or implementation may be utilized in connection with one or more other embodiments and/or implementations. All such combinations and modifications are considered to be within the scope of the present disclosure. As such any inventive concepts herein should not be limited by the specifically described embodiments and implementations.

What is claimed is:

1. A method of mitigating fouling in a delayed coking unit heater comprising:
    forming a plastic mixture comprising a plastic material and a carrier, wherein the carrier is a hydrocarbon carrier selected from the group consisting of: light coker gas oil, heavy coker gas oil, vacuum residue, bitumen, atmospheric residue, pitch from a solvent deasphalting unit, pyrolysis fuel oil, diesel, fluid catalytic cracking slurry oil, decant oil, aromatic solvents, and mixtures thereof;
    heating the plastic mixture; and
    combining the heated plastic mixture with a coker feedstock upstream of a coke drum.

2. The method according to claim 1, wherein forming the plastic mixture comprises one or more of:
    at least partially dispersing the plastic material in the carrier; and
    at least partially dissolving the plastic material in the carrier.

3. The method according to claim 1, wherein forming the plastic mixture comprises:
    combining the plastic material and the carrier using a high-shear mixer.

4. The method according to claim 1, wherein the plastic material is selected from the group consisting of one or more of: polyolefin, polystyrene, polyvinylchloride, waste tire scrap, polyethylene terephthalate, polyester, polyamide, acrylic, and mixtures thereof.

5. The method according to claim 1, wherein the plastic mixture includes between about 5 wt. % to about 50 wt. % plastic material relative to the total mixture.

6. The method according to claim 1, wherein the coker feedstock is selected from the group consisting of one or more of: vacuum residue, bitumen, atmospheric residue, pitch from a solvent deasphalting unit, pyrolysis fuel oil, gas oil, fluid catalytic cracking slurry oil, decant oil, and mixtures thereof.

7. The method according to claim 1, wherein combining the plastic mixture and the coker feedstock includes providing the plastic material at between about 0.5 wt. % to about 30 wt. % of a total of the plastic mixture and the coker feedstock.

8. The method according to claim 1, wherein combining the plastic mixture and the coker feedstock comprises:
    injecting the plastic mixture into the coker feedstock at one or more of:
        an inlet of a coker heater pass;
        a crossover of coker heater passes; and
        a radiant section of a coker heater.

9. The method according to claim 1, wherein:
    heating the plastic mixture comprises one or more of:
        injecting the plastic mixture into one or more coker heater passes at least partially separate from the coker feedstock; and
        injecting the plastic mixture into a dedicated heater at least partially separate from the coker heater feedstock.

10. The method according to claim 1, wherein heating the plastic mixture includes heating the plastic mixture to a first temperature, the method further comprising:

heating the coker feedstock to a second temperature, the second temperature being lower than the first temperature;

wherein combining the plastic mixture and the coker feedstock raises the temperature of the coker feedstock above the second temperature prior to introduction of the combined plastic mixture and coker feedstock into the coke drum, thereby allowing an effective increase in overall delayed coking unit liquid yields.

11. The method according to claim 10, wherein the first temperature is up to about 1000 F.

12. The method according to claim 9, wherein heating the plastic mixture comprises heating the plastic mixture with one or more ceramic coated heater coils, the one or more ceramic coated heater coils reducing fouling rates of the one or more heater coils.

13. A method of mitigating fouling in a delayed coking unit heater comprising:
combining a plastic material with a hydrocarbon carrier to produce a plastic mixture, combining the plastic material with the hydrocarbon carrier including one or more of at least partially dissolving the plastic material in the hydrocarbon carrier and at least partially dispersing the plastic material in the hydrocarbon carrier, wherein the hydrocarbon carrier is selected from the group consisting of one or more of: light coker gas oil, heavy coker gas oil, vacuum residue, bitumen, atmospheric residue, pitch from a solvent deasphalting unit, pyrolysis fuel oil, diesel, fluid catalytic cracking slurry oil, decant oil, aromatic solvents, and mixtures thereof;
heating the plastic mixture;
heating a coker feedstock;
combining the plastic mixture and the coker feedstock; and
transferring the combined plastic mixture and coker feedstock to a coke drum.

14. The method according to claim 13, wherein heating the plastic mixture consists of one or more of:
heating the plastic mixture in a dedicated heater; and
heating the plastic mixture in a dedicated coker heater pass; and
wherein combining the plastic mixture and the coker feedstock includes combining the heated plastic mixture and the coker feedstock.

15. The method according to claim 13, wherein heating the plastic mixture includes heating the plastic mixture to a first temperature, and wherein heating the coker feedstock includes heating the coker feedstock to a second temperature, the second temperature being lower than the first temperature.

16. The method according to claim 13, wherein heating the plastic mixture and heating the coker feedstock includes combining the plastic mixture and the coker feedstock, and passing the combined plastic material and coker feedstock through at least a portion of one or more coker heater passes.

17. The method according to claim 16, wherein combining the plastic mixture and the coker feedstock consists of one or more of:
injecting the plastic mixture into an inlet of a coker heater pass;
injecting the plastic mixture into a crossover of coker heater passes; and
injecting the plastic mixture into a radiant section of a coker heater.

18. The method according to claim 17, wherein injecting the plastic mixture consists of one or more of:
sequentially injecting the plastic mixture into one of a plurality of coker heater passes at a time;
sequentially injecting the plastic mixture into a subset of a plurality of coker heater passes at a time; and
injecting the plastic mixture into a plurality of coker heater passes at one or more of the same time and overlapping times.

19. The method according to claim 13, wherein the plastic material includes from between about 0.5% wt. % to about 30 wt. % of the combined plastic mixture and coker feedstock.

* * * * *